J. J. MEYER.
CARRIER SYSTEM.
APPLICATION FILED FEB. 28, 1908.
901,984.
Patented Oct. 27, 1908.
2 SHEETS—SHEET 1.
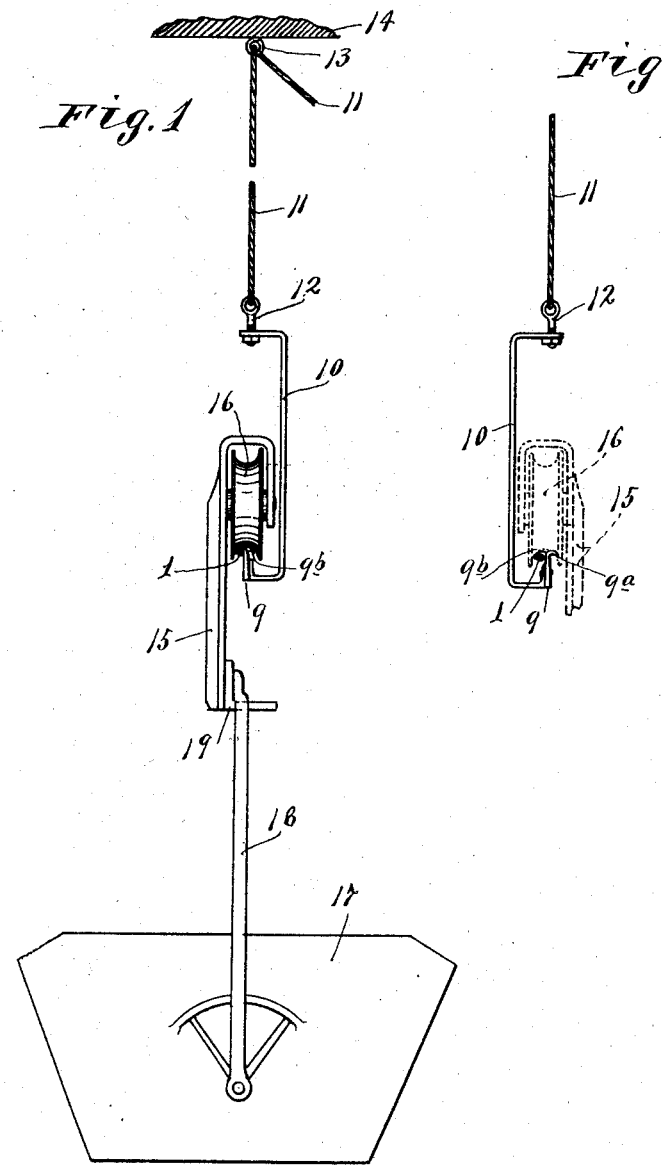
Witnesses.
A. H. Opsahl.
H. D. Kilgore
Inventor.
Julius J. Meyer.
By his Attorneys.
Williamson Merchant

J. J. MEYER.
CARRIER SYSTEM.
APPLICATION FILED FEB. 28, 1908.

901,984.

Patented Oct. 27, 1908.

2 SHEETS—SHEET 2.

Witnesses.
A. H. Opsahl.
H. D. Kilgore

Inventor.
Julius J. Meyer.
By his Attorneys
Williamson Merchant

UNITED STATES PATENT OFFICE.

JULIUS J. MEYER, OF KENYON, MINNESOTA, ASSIGNOR TO THE STANDARD CARRIER CO., OF KENYON, MINNESOTA, A CORPORATION OF MINNESOTA.

CARRIER SYSTEM.

No. 901,984.      Specification of Letters Patent.      Patented Oct. 27, 1908.

Application filed February 28, 1908. Serial No. 418,203.

*To all whom it may concern:*

Be it known that I, JULIUS J. MEYER, a citizen of the United States, residing at Kenyon, in the county of Goodhue and State of Minnesota, have invented certain new and useful Improvements in Carrier Systems; and I do hereby declare the following to be a full, clear, and exact description of the invention, such as will enable others skilled in the art to which it appertains to make and use the same.

My invention relates to tracks or runways for litter carriers and similar traveling trucks, and has for its object to provide improved means whereby the carrier truck may be caused to run from the main track onto any one of several branch tracks, or in either direction upon a transversely extended track.
To the above ends the invention consists of the novel devices and combinations of devices hereinafter described and defined in the claims.

The improvement comprises a turn table or swivel track section and one or more displaceable or movable switch rails. One embodiment of the invention is illustrated in the accompanying drawings, wherein like characters indicate like parts throughout the several views.

Figure 3:
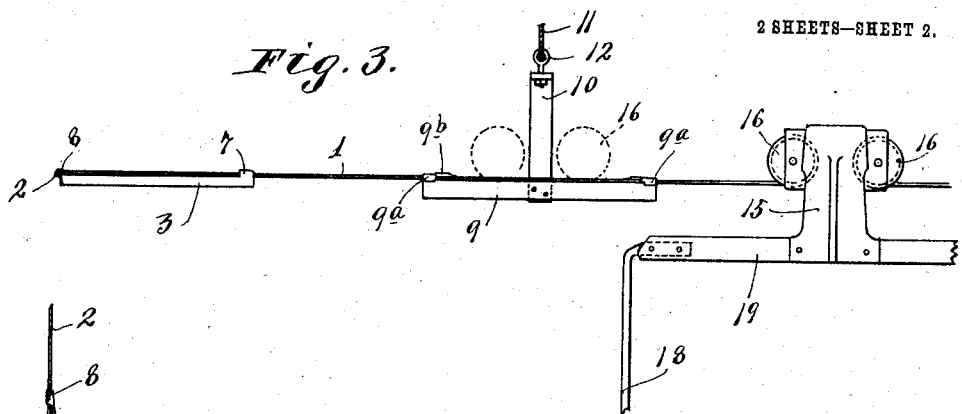
Figure 5:
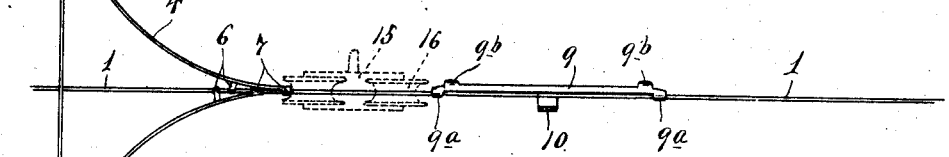
Figure 4:
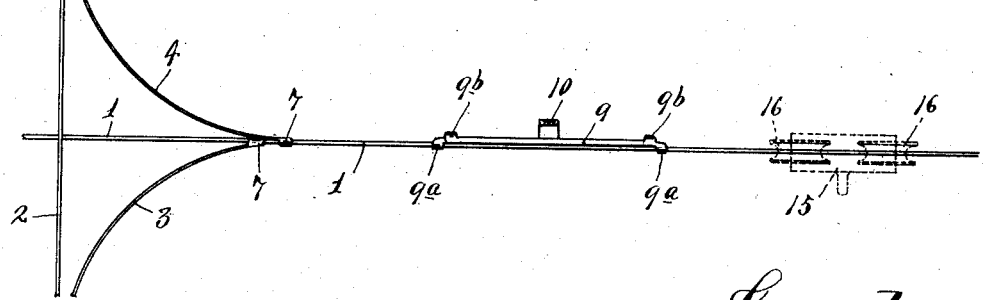

Referring to the drawings, Figure 1 is a view taken transversely of the track, and showing the carrier and switch in end elevation. Fig. 2 is a view corresponding to Fig. 1, with some parts broken away and with the switch turned into an opposite position from that shown in Fig. 1. Fig. 3 is a diagrammatic view in side elevation, corresponding in the position of its parts to Fig. 1, but with some parts broken away. Fig. 4 is a plan view of the parts shown in Fig. 3, the carrier truck being indicated by dotted lines only; and Fig. 5 is a plan view corresponding in the position of its parts to Fig. 2.
The main line track which, as shown, and as usually constructed, is afforded by a heavy wire 1, is supported in an elevated position by the usual or any suitable means (not shown). Extending transversely of this main track wire 1, is a branch track wire 2, which also may be supported in the usual or any suitable way. In the vicinity of the transversely intersecting portions of the track wires 1 and 2 is a pair of curved switch rails 3 and 4, preferably formed by thin metal bars. These switch rails 3 and 4, as herein illustrated, are provided with laterally offset hook-shaped lugs 5, 6, 7 and 8. The hook lugs 5 and 8 detachably engage the cross track wire 2, while the hook lugs 6 and 7 detachably engage the main track wire 1.

If desired, the curved switch rails 3 and 4 may be pivotally connected to the cross wire 2, but the other ends thereof should be detachably engageable with the main wire 1, so that one or the other of the said switch rails may, at any time, be raised out of engagement with the said main track wire and thus temporarily rendered inoperative. Any suitable means may be employed for thus raising the switch rails, at will, into inoperative positions. The purpose of this construction will presently appear.

The so-called turn table is preferably afforded by a comparatively thin metal rail 9 set edgewise in a vertical plane and having an intermediately secured laterally offset and upwardly extended supporting bracket 10. To support this turn table with freedom for pivotal or oscillatory movements in a horizontal plane the upper end of the bracket 10 is shown as connected to a cable 11, by means of a swivel bolt 12, and the said cable 11 is passed through a suitable guide, such as an eye 13, anchored to an overhead support 14. The end of the cable 11 is extended downward to a suitable point where it may be readily reached by the operator, so that the turn table may be raised and lowered by means of the said cable.

The litter carrier shown is of a character such as generally employed in connection with stables, and it comprises, as shown, a truck made up of a bracket-like frame 15 and a pair of grooved truck wheels 16, which latter are arranged to run upon the track wires and switch rails. The litter bucket 17 is pivotally connected in the usual or any suitable way to depending legs 18 of a frame bar 19, which latter is rigidly secured to the depending end of the truck frame 15. The said truck frame 15, it will be noted, depends below the truck wheels 16 at one side only thereof, so that when the offset supporting bracket 10 of the turn table is thrown at the opposite side of the track from said depending portion of the truck frame, the truck is adapted to pass over the rail portion 9 of said turn table (see particularly Figs. 1 and 2).

At its ends the turn table rail 9 is provided with a pair of outwardly offset hook lugs $9^a$ and with a similar pair of inwardly offset hook lugs $9^b$, either pair of which is adapted to be rested upon the main track wire 1.

For our first illustration we will assume that the carrier is to be switched onto the cross track 2 over the switch rail 4, in which case the switch rail 3 should be elevated from working position or out of engagement with the main track wire 1. We will also assume that the carrier truck on the main track wire 1 stands with its depending frame portion on the opposite side of the track wire 1 from the direction in which the said switch rail 4 extends. In order to make it possible for the carrier to run over the said switch rail 4, it is first necessary to rotate the same 180 degrees, so as to throw its depending frame portion 15 on that side of the main track wire 1 on which the said switch rail 4 projects. To do this a turn table is set in the position shown in Figs. 1 and 4 and its outwardly offset lugs $9^a$ are engaged with the track rail 1. This being done, the carrier may be moved until its truck wheels 16 rest upon the turn table rail 9. Then the turn table should be raised so as to disengage its hooks $9^a$ from the track wire 1. Then the turn table, with the carrier, should be rotated 180 degrees and the track wire 1 should be forced between the bracket 10 and the adjacent short portion of the truck frame 15 into engagement with the inner hook lugs $9^b$ of the turn table bar 9, as shown in Figs. 2 and 5. This brings the long depending portion of the truck frame 15 on that side of the track wire 1 on which the switch rail 4 is located, and the said carrier truck may then be run over the switch rail 4 onto the transverse or cross track wire 2.

When the carrier truck is to be run over the switch rail 3, a similar operation to that above described is carried out but, of course, the switch rail 4 is first raised from working position and the turn table is set in a reverse position from that shown in Figs. 1 and 4, before the carrier truck is run onto the rail 9 thereof. It will, of course, be understood that more than two switch rails may be used in connection with the turn table and that these switch rails may be arranged to run the carrier truck onto any one of several cross or branch tracks.

It will also be understood that the device described may be used in connection with various carrier systems wherein a carrier truck is run over elevated rails.

What I claim is:

1. In a carrier system of the kind described, the combination with elevated tracks extended transversely of each other, and one or more displaceable switch rails connecting the same, of a swiveled turn table adjacent to one of said rails, the said rail being continuous past said turn-table, substantially as described.

2. In a carrier system of the kind described, the combination with elevated track wires extending transversely of each other, and one or more displaceable switch rails connecting said track wires, of a turn table comprising a rail, a laterally offset upwardly extended rail supporting bracket, and a swivel connection supporting said turn table bracket from an overhead support, substantially as described.

3. In a carrier system of the kind described, the combination with track wires extending transversely of each other, and one or more displaceable curved switch rails connecting said track wires, of a turn table comprising a horizontal rail having inwardly and outwardly offset pairs of lugs for engagement with one of said track wires, a laterally offset upwardly extended rail supporting bracket, and a swivel connection supporting said turn table track from an overhead support, substantially as described.

4. In a carrier system of the kind described, the combination with track wires extending transversely of each other, and reversely curved and extended displaceable switch rails connecting said track wires, of a turn table comprising a horizontally extended rail, a laterally offset upwardly extended rail supporting bracket, and a swivel connection applied to the upper end of said turn table bracket and supporting the same with freedom for vertical and for horizontal oscillatory movements, substantially as described.

In testimony whereof I affix my signature in presence of two witnesses.

JULIUS J. MEYER.

Witnesses:
ALBERT MOHN,
EDMUND BACKE.